(No Model.)  5 Sheets—Sheet 1.
J. SCHNEIBLE.
APPARATUS FOR CHARGING LIQUIDS WITH GAS.
No. 571,694. Patented Nov. 17, 1896.
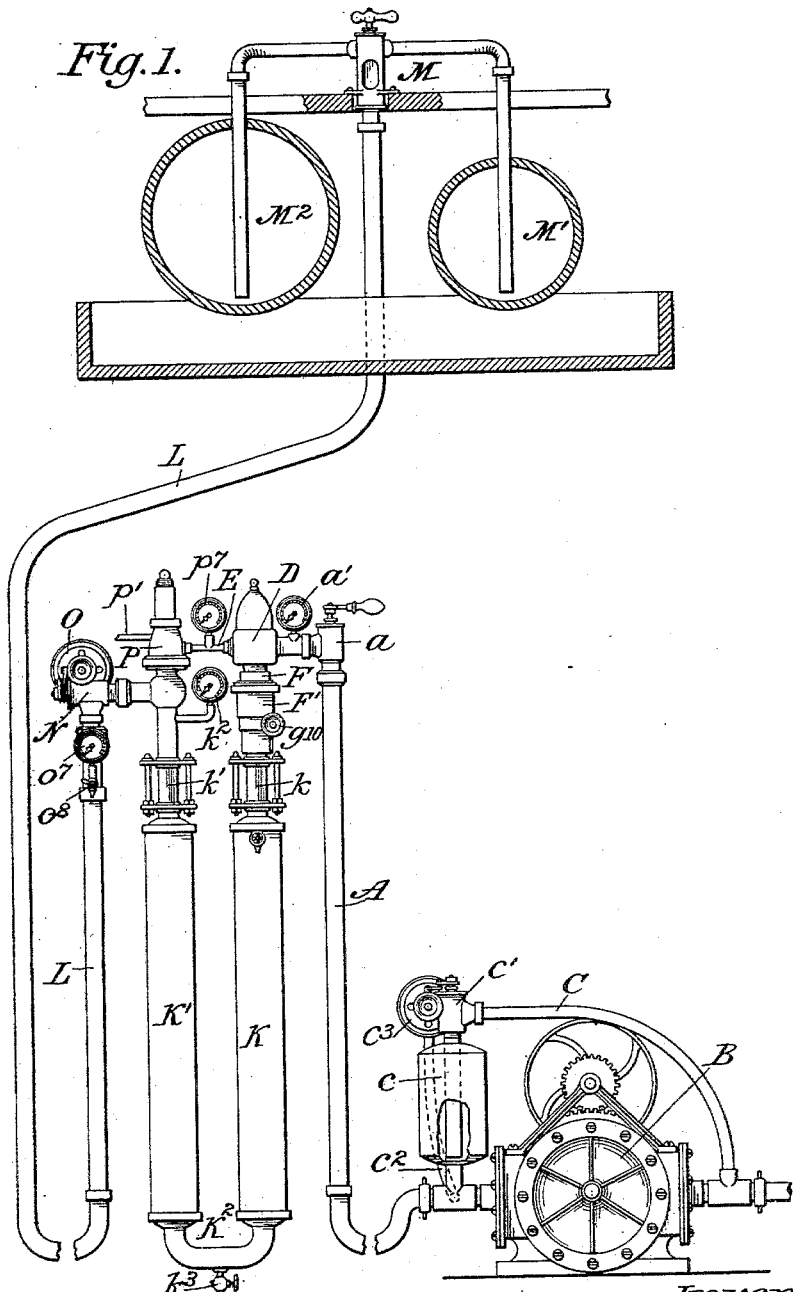

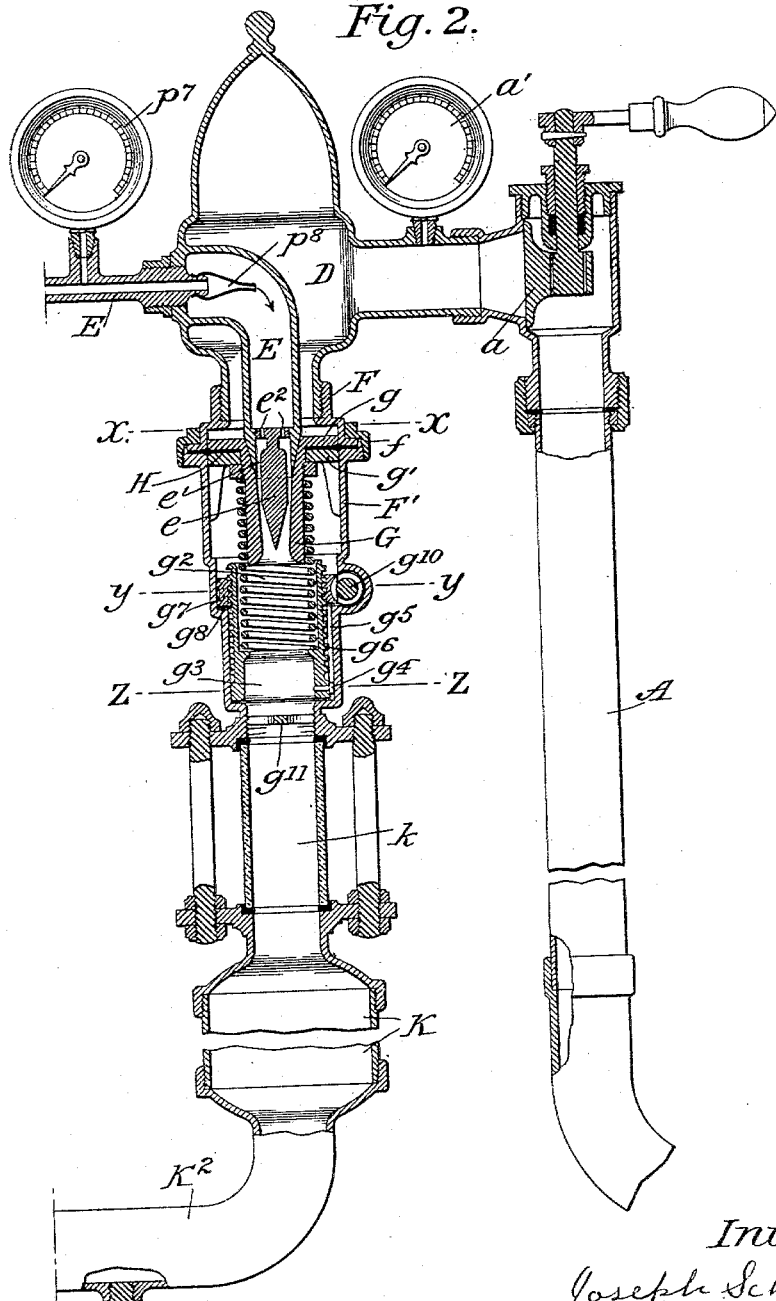

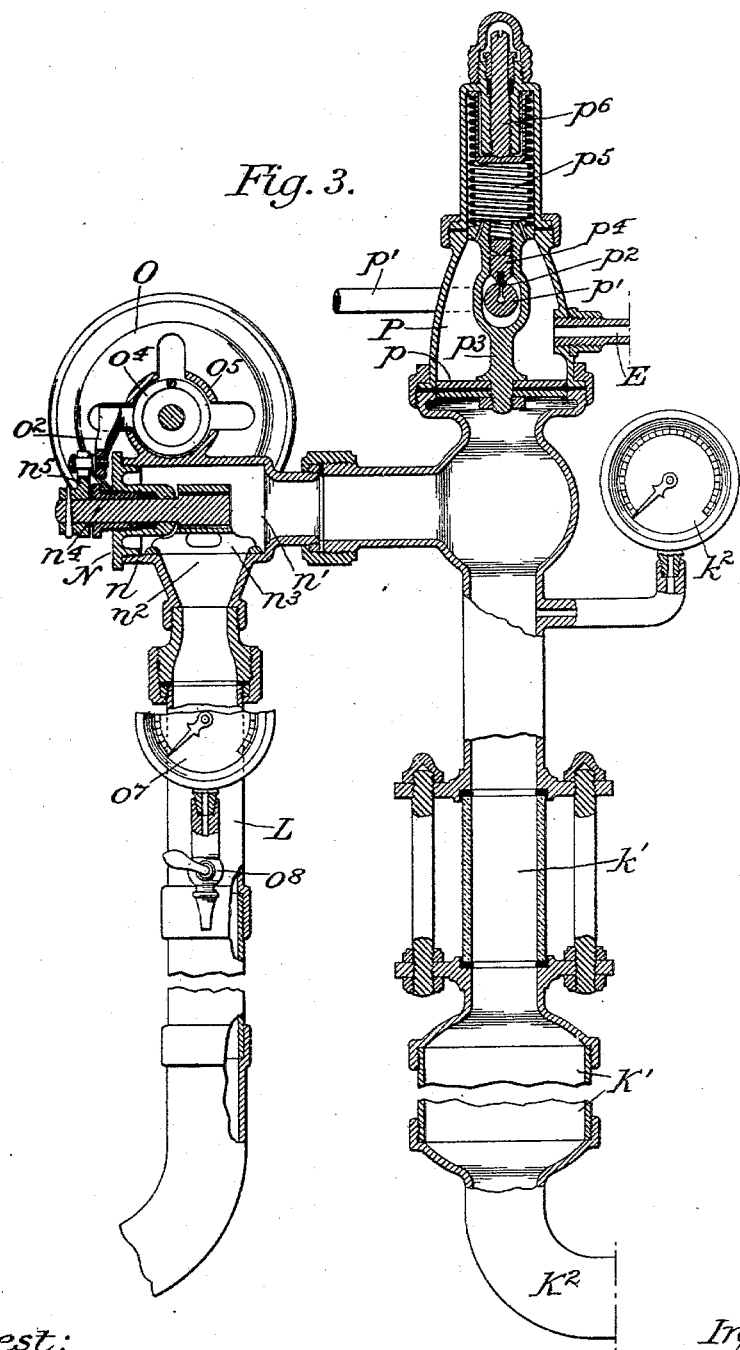

(No Model.) 5 Sheets—Sheet 4.
J. SCHNEIBLE.
APPARATUS FOR CHARGING LIQUIDS WITH GAS.
No. 571,694. Patented Nov. 17, 1896.
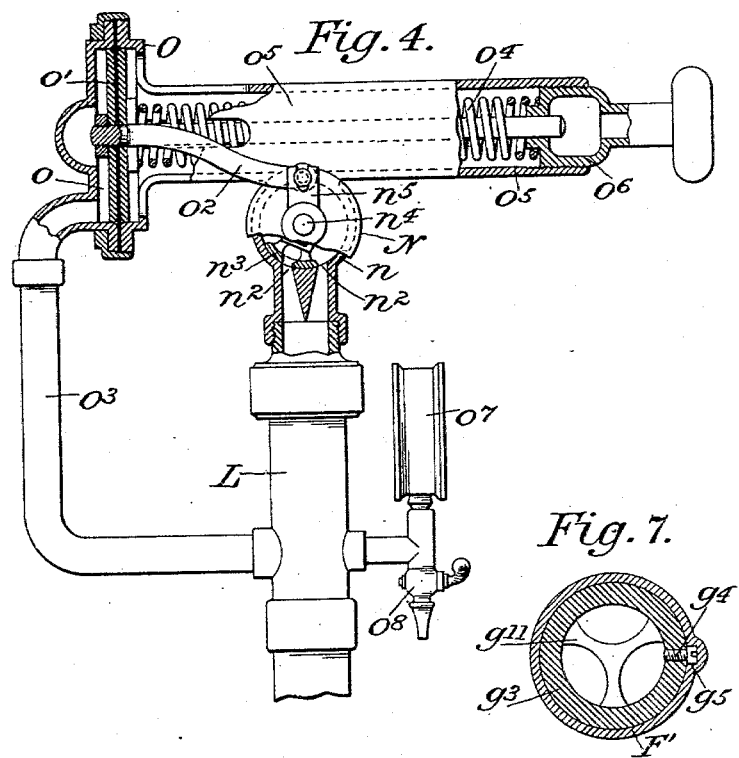
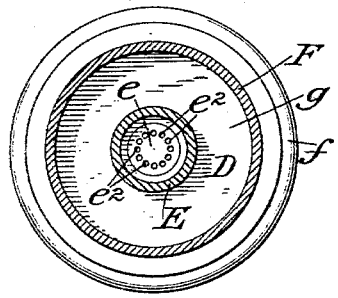
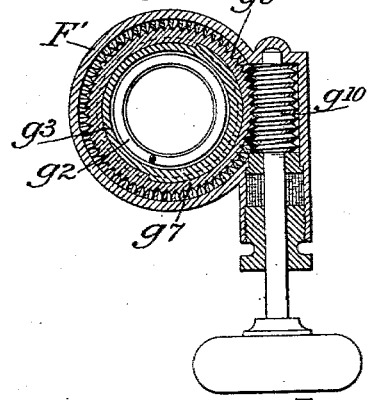

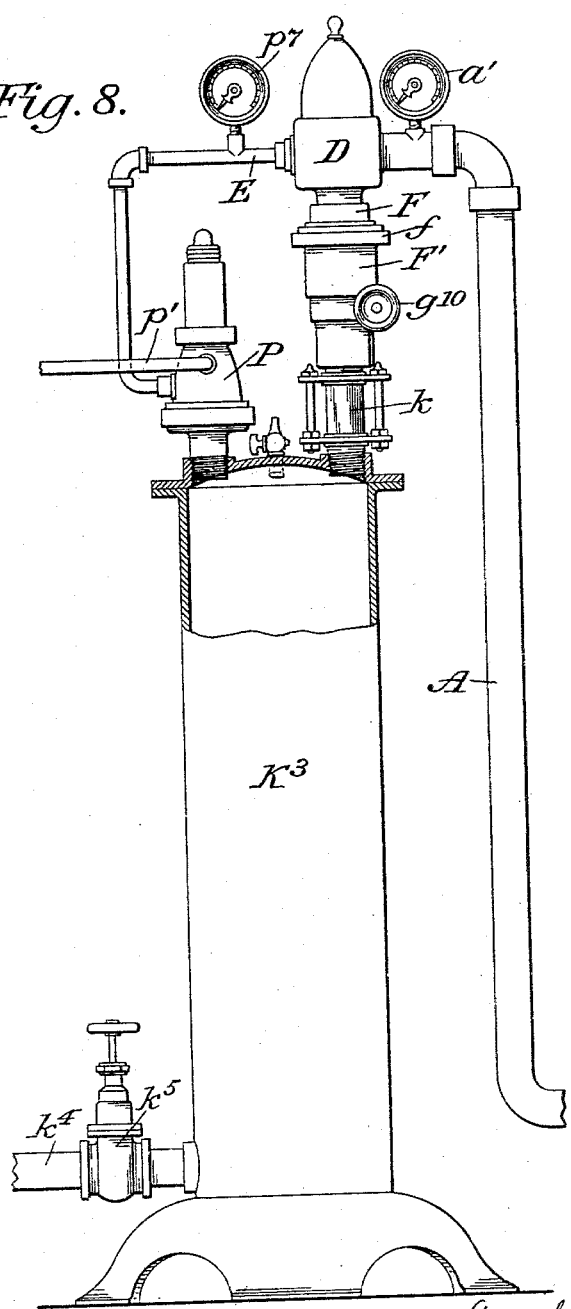

UNITED STATES PATENT OFFICE.

JOSEPH SCHNEIBLE, OF NEW YORK, N. Y.

APPARATUS FOR CHARGING LIQUIDS WITH GAS.

SPECIFICATION forming part of Letters Patent No. 571,694, dated November 17, 1896.

Application filed April 15, 1895. Renewed September 2, 1896. Serial No. 604,676. (No model.)

*To all whom it may concern:*

Be it known that I, JOSEPH SCHNEIBLE, a citizen of the United States, and a resident of the city, county, and State of New York, have invented certain new and useful Improvements in Apparatus for Charging Liquids with Gas, of which the following is a specification, reference being had to the accompanying drawings, forming part thereof.

In another application, filed December 4, 1893, and serially numbered 492,783, upon which Letters Patent No. 438,086 were issued to me April 23, 1895, I have disclosed a method of charging liquids with gas, and for the purpose of enabling the method to be more clearly understood I have described and shown in said application a form of apparatus which is capable of carrying the method into effect. I did not, however, in said application lay claim to any features of the apparatus shown, but limited the application to the novel method.

It is my object in the present application to describe and claim the apparatus which I have devised with special reference to the practical operation of such before-mentioned method, and I have aimed to produce an apparatus which should be simple in construction, compact, capable of regulation as may be desired to vary the character of the product, and automatic in operation to such an extent as to require little supervision after it has been set or regulated according to the result desired.

The invention will be fully described hereinafter with reference to the accompanying drawings, which represent practical and efficient embodiments thereof.

In said drawings, Figure 1 shows in side elevation one form of the apparatus, a part of the pressure-chamber of the pump being broken out and devices for filling the charged liquid into vessels being indicated partly in section. Fig. 2 is an elevation, partly in section and partly broken away, of the right-hand portion of the charging apparatus shown in Fig. 1, but drawn to a larger scale. Fig. 3 is a similar view of the left-hand portion of the apparatus. Fig. 4 is a detail view, partly in section and partly in elevation, of the devices shown in Fig. 3 for regulating the escape of the charged liquid from the apparatus, the direction of sight being at right angles to that of Fig. 3. Fig. 5 is a horizontal section on the line $x\ x$ of Fig. 2. Fig. 6 is a horizontal section on the line $y\ y$ of Fig. 2. Fig. 7 is a horizontal section on the line $z\ z$ of Fig. 2. Fig. 8 is a view, partly in elevation and partly in section, of a different form of the apparatus.

The present invention may find expression in various forms of apparatus, and it is therefore to be understood that the apparatus shown in the drawings and described in detail herein are merely approved forms and that it is not intended by such drawings and description to restrict the invention to any particular construction or arrangement, but only to explain and set forth more clearly thereby the nature of the invention. As a matter of fact, moreover, the apparatus will be varied more or less according to the particular uses for which it is intended or the conditions under which it is used, and while it is not possible, within reasonable limits, to show all forms in which the invention may be embodied, neither is it practicable to show all the forms which are specially adapted for particular uses.

The apparatus shown in general in Figs. 1, 2, and 3, with certain details of construction in Figs. 4, 5, 6, and 7, is devised with particular reference to its use in charging beer or other beverages with carbon dioxid, while that shown in Fig. 8 is designed for the charging of water with the same gas. For other liquids or other gases other changes of form and arrangement may require to be made.

The apparatus shown in Figs. 1 to 7, inclusive, will first be described.

In the apparatus referred to the liquid to be charged is conducted to the charging devices through a suitable pipe or other conductor A from any convenient source of supply by means of which a substantially constant pressure may be maintained. This might be a vessel supported at a proper elevation above the charging devices, or a closed vessel in which a suitable pressure is secured by forcing in gas or air, or a pump, as indicated at B in Fig. 1. If a pump be used, it is preferably, as represented, a rotary pump, as a substantially constant pressure can thereby be maintained without difficulty, but any pump adapted for the purpose can be used in its place. The pump is preferably provided with a by-pass and with automatic controlling devices therefor, so that any tendency toward an increase of pressure on the liquid, after leaving the pump, above the predetermined degree may be checked and a substantial uniformity of pressure secured. The by-pass pipe C is represented as having interposed in its length a pressure-chamber $c$ and a regulating-valve $c'$, while from the pump-outlet or the pipe A a small pipe $c^2$ communicates with a diaphragm-chamber $c^3$ and thereby communicates the pressure in the pump-outlet or pipe A to the diaphragm in the chamber which by its movement controls the valve. These parts may be of any usual or preferred construction, and therefore require no further description herein. Devices of similar character, although applied at another part of the apparatus, are shown somewhat in detail in Fig. 4 and are fully described hereinafter, and to such figure and such description reference may be had for a clearer description of the nature of the devices, if it be necessary. It is obvious that the supply of liquid can be controlled by regulating the speed of the pump.

The liquid supplied under the desired conditions as to degree and uniformity of pressure by whatever means is delivered to the charging devices through the conductor A, as aforesaid, and if desirable a manually-operated valve $a$ may be introduced in the conductor so that the flow of liquid through the apparatus may be wholly checked when necessary. A pressure-gage $a'$ may also be applied near the same point. The liquid is delivered at once to that part of the apparatus to which the gas is also delivered and where the mingling of the gas and liquid is effected, those devices by means of which the mingling is effected and the liquid is caused to regulate and control the flow of gas and to determine the quantity thereof which shall be mingled with itself being also located at the same point.

The device or devices referred to are comprised mainly, in the form of apparatus shown, in a self-regulating variable aspirator which will presently be described, reference being had particularly to Figs. 2, 5, 6, and 7. The pipe A communicates directly with a chamber D, which is preferably of such diameter as to permit the gas inlet or conductor E to be introduced centrally in the chamber D. The said gas-conductor E preferably terminates in a core $e$, having an annular opening $e'$ with which the conductor E communicates through one or more holes $e^2$ $e^2$, the core $e$ being otherwise solid and tapering, as represented, at its extremity. Below the chamber D and forming an extension thereof is a shell or casing composed, preferably, of the two parts F F', and within the shell is supported a sleeve G, which coöperates with the core $e$ to form, under certain circumstances, an aspirator or jet-pump or other device of that character by means of which the gas, although supplied under a lower pressure than that on the liquid, is made to flow and to enter and be mingled with the flowing liquid, the quantity of gas being determined by the flow of the liquid. It will be understood that in order to accomplish this result there is provided in this portion of the apparatus a constrictive passage for the liquid, such as the space within the sleeve G, which tends to form in the stream of liquid a *vena contracta*, that the stream is allowed to enlarge or expand beyond such *vena contracta*, as by the enlargement of the bore of the sleeve or its continuation with less abrupt taper, or the formation of a chamber beyond this point, as described hereinafter, and that the opening $e'$ for the gas is so situated between the constrictive passage and the enlargement as to admit the gas to the stream of liquid at or beyond the *vena contracta*. For convenience of description I shall hereinafter refer to this device or portion of the apparatus as an "aspirator."

In order that the aspirator may be capable of regulation to alter the conditions of operation and thereby to increase or diminish the relative quantity of gas introduced into the liquid and in order that it may also be automatically variable to accommodate itself to variations in the supply of gas or liquid or in other conditions of operation, so that when once regulated to effect the charging of the liquid to a certain degree it shall thereafter continue to effect the charging to the same degree, notwithstanding such variations in the conditions of operation; the aspirator is preferably constructed substantially as shown in Figs. 2, 5, 6, and 7. As there represented the sleeve G has its bore internally tapered near its upper end to conform substantially to the taper of the core $e$ and thereafter continue with a more gradual taper to a point about on a line with the extremity of the core $e$, where the sleeve terminates or its bore increases, so that the area in cross-section of the continuation shall be considerably greater than the area in cross-section of the orifice, that is, the annular space between the sleeve and the gas-inlet, through which space the liquid flows. The sleeve is longitudinally movable within the shell, so that the area of the space between the sleeve and gas-inlet may be increased or diminished, and is supported by a yielding diaphragm or equivalent thereof, which allows the sleeve to move with the variations of pressure.

As shown, an annulus H, of sheet metal or leather or rubber or other suitable material more or less flexible and yielding, is clamped at its outer edge between the two parts F and F' of the shell (a locking-ring $f$ being employed to secure the two parts together) and at its inner edge is clamped between a flange $g$ of the sleeve G, which flange has a working fit like a piston in the shell, and a ring $g'$, which also has a working fit in the shell. The flexible annulus is thus supported and protected against undue stretching and is in the nature of an absolute impervious packing for the piston $g\ g'$.

The "diaphragm," as for convenience I designate the support for the sleeve G, whether it be regarded as a diaphragm or as a piston, normally maintains the sleeve in contact with its seat on the gas-inlet, thereby preventing the flow of liquid and, as the gas does not flow if the liquid does not, of the gas also. It will be obvious that with an increase of pressure on the upper side of the diaphragm above that on the under side the sleeve will move downwardly, the orifice through which the liquid flows will be opened and enlarged, and the capacity of the aspirator will be increased, thereby increasing the flow of the gas so that the relative quantities of gas and liquid shall remain substantially constant. It will also be understood that an increase of pressure on the under side of the diaphragm will raise the sleeve, diminishing the orifice through which the liquid flows and correspondingly reducing the capacity of the aspirator and the flow of the gas.

In order that the movement of the sleeve to its seat may be assured when the pressure on its upper surface is reduced below the minimum, or where the pressure on the under surface increases above the maximum, and in order also that the aspirator may be caused to open more or less for a given pressure for the purpose of increasing or diminishing the quantity of gas introduced for a given quantity of liquid, I have provided means capable of easy and exact adjustment whereby pressure may be applied to the under side of the diaphragm while it is still supported in a yielding manner and is capable of moving under variations of fluid-pressure. The diaphragm is accordingly supported by a spring $g^2$, which is carried by a sleeve $g^3$ within the lower part of the shell F'. The sleeve is held from rotation by a pin $g^4$ engaging a vertical groove $g^5$ in the shell-wall, and is provided with an exterior screw-thread $g^6$ for engagement by a nut $g^7$, which rests on a shoulder $g^8$. The nut has exterior teeth $g^9$ for engagement by a tangent-screw $g^{10}$, properly seated in the wall of the casing. By these means the aspirator may be regulated to vary the degree of charging, as may be required.

Connected to the aspirator is an absorption vessel, which may vary in size and form according to the conditions of use. As shown, it consists of two cylinders K and K', connected by a bend $K^2$. Observation-glasses may be provided at $k$ and $k'$ and a pressure-gage at $k^2$, and a drain-cock $k^3$ may be inserted in the bend $K^2$. A dash-plate $g^{11}$ may be placed immediately below the aspirator to break up the stream and so set up the aspirating action when commencing to operate with an empty absorption vessel. It is not needed when the vessel is filled.

From the absorption vessel the charged liquid passes to the delivery-pipe L, by which it may be conducted to the place of discharge, and it is immaterial, so far as the present invention is concerned, into what the liquid is finally delivered, whether it be into bottles, siphons, fountains, a storage cask or vessel, or into barrels or kegs, as indicated in Fig. 1, in which there is shown, for convenience, an ordinary racking-bock M, adapted to deliver the liquid to barrels or kegs M' $M^2$. It is desirable, however, for the attainment of the best results that means should be provided for controlling the escape of the liquid from the absorption vessel, so that there may be maintained on the liquid therein a substantially uniform pressure, notwithstanding variations in the discharge of liquid from the delivery-pipe and the consequent tendency to variation in the pressure on the liquid in said pipe. The means represented in the drawings (see Figs. 3 and 4) comprise a valve N, inserted at a suitable point, a diaphragm or sensitive regulator O, subject to variations of pressure on the liquid in the delivery-pipe or after it has passed said valve, and devices or connections intermediate said regulator and valve for regulating or controlling the latter by the action of the former. As shown in the drawings, the valve may comprise a cylindrical shell $n$, having an open end $n'$ to admit the liquid and lateral ports $n^2\ n^2$ for its discharge, an arc-shaped gate $n^3$, having a seat within the shell and adapted to close or open said ports, and a valve-stem $n^4$, mounted in a suitable stuffing-box in the closed end of said shell and having fixed thereto a crank-arm $n^5$ by which the gate may be oscillated. The regulator O may comprise, as shown, a chamber $o$, in which is supported a diaphragm or sensitive regulator $o'$, adapted to yield with the varying pressure thereon, and a connecting-arm $o^2$ between said diaphragm and the crank-arm $n^5$. The pressure on the liquid in the delivery-pipe L may be transmitted to one face of the diaphragm $o'$ by a pipe $o^3$, which is connected to the delivery-pipe L and to the chamber $o$, and in order that the pressure at which the diaphragm shall move may be determined a spring $o^4$, inclosed within the tube $o^5$ and controlled by an adjusting-nut $o^6$, may be arranged to bear with greater or less pressure against the diaphragm in opposition to the fluid-pressure on its front face. A pressure-gage $o^7$ and a petcock $o^8$ may be connected to the delivery-pipe L, if desired.

If the conditions of charging with the apparatus thus far described were unchanged and the gas were supplied under a constant pressure, no other devices than those already mentioned would be necessary, but as there might be some variation in the pressure on the gas supply and as the apparatus must be capable of charging under different conditions, it is desirable that means should be provided whereby the supply of gas to the aspirator may be varied more or less, according to different pressures on the liquid in the absorption vessel. Such means comprise a diaphragm or regulator sensitive to variations of pressure in the absorption vessel and a valve controlled thereby to regulate the flow of gas to the aspirator. As shown in Fig. 3, there is connected with the absorption vessel a chamber P, in which is mounted a diaphragm $p$, adapted to move with the varying pressure in said vessel. The conductor E, which leads the gas to the charging or mixing point, is connected to the chamber P on the opposite side of the diaphragm $p$, and the gas is admitted to the same chamber through a pipe $p'$, having lateral port and valve-seat $p^2$. A stem $p^3$ is connected to the diaphragm $p$ and carries a valve-plug $p^4$, which is adapted to control the flow of gas through said port. Consequently if the pressure in the absorption vessel increases it tends to lift the diaphragm and the valve-plug and to permit a proportionately greater flow of gas through the port $p^2$, while on the contrary if the pressure of gas in the chamber P increases relatively it tends to depress the diaphragm and the valve-plug and to reduce the flow of gas to the proper degree. In order that the valve may close when the operation of the apparatus ceases and in order also that the pressure on the liquid in the absorption vessel may be, as required for the best results, somewhat greater than that under which the gas is supplied, a compensating spring $p^5$ is arranged to press upon the stem $p^3$ in opposition to the diaphragm, and a suitable adjusting-screw $p^6$ is provided for regulating the tension of the spring. A pressure-gage $p^7$ may be applied to the chamber or pipe E, as shown, and an ordinary flexible-tube check-valve $p^8$ may also be applied at a suitable point in the conductor E, as indicated in Fig. 2, to prevent the possibility of backflow therein.

The operation of the several parts of the apparatus has been set forth as such parts have been described, but in order that a clearer understanding of the invention may be had the operation of the apparatus as a whole will now be explained briefly. The liquid to be charged is supplied from the pump or other source under such pressure as may be required in view of the result to be obtained. Thus in charging beer the pressure on the uncharged liquid would be usually about thirty-five pounds, more or less, above the normal, while for charging water the pressure would be considerably greater. The pressure is reduced as the liquid passes through the aspirator, and in the absorption vessel the pressure would be maintained at about twenty pounds for beer. For water the difference between the pressure on the uncharged liquid and that in the absorption vessel would be greater. For a pressure of about thirty-five pounds on the uncharged liquid and a pressure of about twenty pounds in the absorption vessel the gas is brought to the aspirator under a pressure of about sixteen to eighteen pounds, the proper relative pressure being maintained, if desired, by pressure-regulators independent of the apparatus, but preferably by the regulator P, which enables slight variations or inequalities of pressure to be compensated for automatically, and also is capable of adjustment to permit a greater or less quantity of gas to be supplied for a given pressure in the absorption vessel. It will be observed that the gas is caused to flow through the aspirator against a pressure greater than that under which it is supplied, being drawn in and impelled forward by and with the liquid, whereby the gas is always under control and the quantity of gas mixed with the liquid is measured by and bears a predetermined relation to the quantity of liquid and a product of uniform quality is obtained.

As the liquid and gas pass through the aspirator and into the absorption vessel they are intimately mingled and a rapid and complete absorption of the gas takes place during the passage of the liquid through said vessel. The action of the pump or other source of liquid supply provides for the establishment of the required pressure in the absorption vessel, and if the final discharge of the liquid is constant and uniform no additional devices for the regulation of the escape of liquid from the absorption vessel will be necessary, but when such discharge varies from time to time, as it will when the apparatus is connected directly to the usual racking-bock, it is desirable to provide means whereby the pressure on the liquid in the discharge-pipe may regulate the escape of the liquid from the absorption vessel. Accordingly the governor or regulator O and valve N are added to the apparatus to supplement or relieve the automatically-variable aspirator and aid in maintaining the uniform quality of the finished product. Thus if the flow at the racking-bock is reduced the pressure on the liquid in the discharge-pipe will tend to increase, which will cause the regulator to shift the valve and reduce the escape of liquid from the absorption vessel. The pressure in said vessel will then tend to increase and immediately the aspirator will respond and reduce the flow of liquid therethrough, and the governor or regulator on the pump will also respond and will reduce the supply of liquid in proportion to the reduction in the discharge at the racking-bock.

Referring now to the apparatus shown in Fig. 8, it will be observed that the difference between the construction there shown and that previously described is mainly a difference of form and arrangement, and like parts in the two constructions are represented by like letters of reference. The "aspirator," so called, inclosed within the shell or casing F F' is the same as that shown in Figs. 1, 5, 6, and 7, and the regulator within the chamber P is also the same as that shown in Fig. 3 and serves the same purpose. The valve N and regulator O are dispensed with, as has been stated might be done, and in place of the two cylinders K and K' is substituted a single vessel K³, which may be provided near its bottom with a delivery-pipe k⁴ and cut-off valve k⁵. The operation of this form of apparatus is the same as that already described for like parts in the other form shown, and needs no further explanation herein.

It will be readily understood that the invention herein set forth may be embodied in a great variety of devices and that it is not to be limited to the precise construction and arrangement shown.

What I claim, and desire to secure by Letters Patent, is—

1. In an apparatus for charging liquids with gas, the combination of a liquid supply, a gas supply, a device to which both the liquid and the gas can be delivered and by means of which the gas is mingled with the liquid and impelled forward thereby and therewith, said device comprising a constrictive passage for the liquid, a chamber of relatively larger diameter than the stream of liquid and into which the liquid and gas are delivered, and an opening to admit the gas to the constricted stream of liquid, an absorption vessel and means actuated by the pressure on the discharged liquid to control the escape of the charged liquid from the absorption vessel.

2. In an apparatus for charging liquids with gas, the combination of a liquid supply, a gas supply, an aspirator to which the liquid is delivered and by which the gas is drawn into and mingled with the liquid and impelled forward therewith, said aspirator comprising a constrictive passage for the liquid, a chamber of relatively larger diameter than the stream of liquid and into which the liquid and gas are delivered, and an opening to admit the gas to the constricted stream of liquid, an absorption vessel and means actuated by the pressure on the discharged liquid to control the escape of the charged liquid from the absorption vessel.

3. In an apparatus for charging liquids with gas, the combination of a liquid supply, a gas supply, an aspirator to which the liquid and gas can be delivered, said aspirator comprising a constrictive passage for the liquid, a chamber of relatively larger diameter than the stream of liquid and into which the liquid and gas are delivered, and an opening to admit the gas to the constricted stream of liquid, an absorption vessel, a valve to control the escape of the charged liquid from the absorption vessel, a diaphragm subject to the pressure of the liquid after it passes said valve, and means intermediate the diaphragm and valve whereby the movement of the former controls the latter.

4. In an apparatus for charging liquids with gas, the combination of a liquid supply, a gas supply, a device to which both the liquid and the gas can be delivered and by means of which the gas is mingled with the liquid and impelled forward therewith and thereby, said device comprising a constrictive passage for the liquid, a chamber of relatively larger diameter than the stream of liquid and into which the liquid and gas are delivered, and an opening to admit the gas to the constricted stream of liquid, an absorption vessel, and means operated by the pressure of the liquid in the absorption vessel to control the gas supply.

5. In an apparatus for charging liquids with gas, the combination of a liquid supply, a gas supply, an aspirator to which the liquid and gas can be delivered, said aspirator comprising a constrictive passage for the liquid, a chamber of relatively larger diameter than the stream of liquid and into which the liquid and gas are delivered, and an opening to admit the gas to the constricted stream of liquid, an absorption vessel, and means operated by the pressure of the liquid in the absorption vessel to control the gas supply.

6. In an apparatus for charging liquids with gas, the combination of a liquid supply, a gas supply, an aspirator to which the liquid and gas can be delivered, said aspirator comprising a constrictive passage for the liquid, a chamber of relatively larger diameter than the stream of liquid and into which the liquid and gas are delivered, and an opening to admit the gas to the constricted stream of liquid, an absorption vessel, a valve to regulate the supply of gas, a diaphragm subject to the pressure of the liquid in the absorption vessel, and means intermediate the diaphragm and valve whereby the movement of the former controls the latter.

7. In an apparatus for charging liquids with gas, the combination of a liquid supply, a gas supply, a variable aspirator to which the liquid and gas can be delivered and which changes with varying pressure to vary the flow through the same, and an absorption vessel.

8. In an apparatus for charging liquids with gas, the combination of a liquid supply, a gas supply, a variable aspirator to which the liquid and gas can be delivered and which changes with varying pressure to vary the flow through the same, an absorption vessel, and means to control the escape of the charged liquid from the absorption vessel.

9. In an apparatus for charging liquids with gas, the combination of a liquid supply, a gas supply, a variable aspirator to which the liquid and gas can be delivered, and which changes with varying pressure to vary the flow through the same, an absorption vessel, a valve to control the escape of the charged liquid from the absorption vessel, and a diaphragm subject to the pressure of the liquid after it passes said valve and adapted to control said valve.

10. In an apparatus for charging liquids with gas, the combination of a liquid supply, a gas supply, a variable aspirator to which the liquid and gas can be delivered, a diaphragm connected to the aspirator to control the same, an absorption vessel, and means to control the escape of the charged liquid from the absorption vessel.

11. In an apparatus for charging liquids with gas, the combination of a liquid supply, a gas supply, a variable aspirator to which the liquid and gas can be delivered, a diaphragm connected to the aspirator to control the same, an absorption vessel, a valve to control the escape of the charged liquid from the absorption vessel, a diaphragm subject to the pressure of the liquid after it passes said valve and adapted to control said valve.

12. In an apparatus for charging liquids with gas, the combination of a liquid supply, a gas supply, a device to which both the liquid and the gas can be delivered and by means of which the gas is mingled with the liquid and impelled forward thereby and therewith, said device comprising a constrictive passage for the liquid, a chamber of relatively larger diameter than the stream of liquid and into which the liquid and gas are delivered, and an opening to admit the gas to the constricted stream of liquid, an absorption vessel, and means operated by the pressure on the liquid in advance of said device to regulate the supply of liquid.

13. In an apparatus for charging liquids with gas, the combination of a liquid supply, a gas supply, an aspirator to which the liquid and gas can be delivered, said aspirator comprising a constrictive passage for the liquid, a chamber of relatively larger diameter than the stream of liquid and into which the liquid and gas are delivered, and an opening to admit the gas to the constricted stream of liquid, an absorption vessel and means operated by the pressure on the liquid in advance of the aspirator to regulate the supply of liquid.

14. In an apparatus for charging liquids with gas, the combination of a liquid supply, a gas supply, an aspirator to which the liquid and gas can be delivered, said aspirator comprising a constrictive passage for the liquid, a chamber of relatively larger diameter than the stream of liquid and into which the liquid and gas are delivered, and an opening to admit the gas to the constricted stream of liquid, an absorption vessel, means to control the delivery of the liquid from the absorption vessel, a diaphragm subject to the pressure on the liquid in advance of the aspirator and means controlled by said diaphragm to regulate the supply of liquid.

15. In an apparatus for charging liquids with gas, the combination of a liquid supply, a gas supply, a device to which both the liquid and the gas can be delivered and by means of which the gas is mingled with the liquid and is impelled forward thereby and therewith, said device comprising a constrictive passage for the liquid, a chamber of relatively larger diameter than the stream of liquid and into which the liquid and gas are delivered, and an opening to admit the gas to the constricted stream of liquid, an absorption vessel, and means to maintain in said absorption vessel a pressure greater than the pressure on the gas before mingling.

16. In an apparatus for charging liquids with gas, the combination of a liquid supply, a gas supply, an aspirator to which the liquid can be delivered and by which the gas is drawn into and impelled forward and mingled with the liquid, said aspirator comprising a constrictive passage for the liquid, a chamber of relatively larger diameter than the stream of liquid and into which the liquid and gas are delivered, and an opening to admit the gas to the constricted stream of liquid, an absorption vessel, and means to maintain in said absorption vessel a pressure greater than the pressure on the gas before mingling.

17. In an apparatus for charging liquids with gas, the combination of a liquid supply, a gas supply, a device to which both the liquid and the gas can be delivered and by means of which the gas is mingled with the liquid and is impelled forward thereby and therewith, said device comprising a constrictive passage for the liquid, a chamber of relatively larger diameter than the stream of liquid and into which the liquid and gas are delivered, and an opening to admit the gas to the constricted stream of liquid, an absorption vessel, and means to maintain a predetermined difference between the pressures on the liquid and on the gas before mingling.

18. In an apparatus for charging liquids with gas, the combination of a liquid supply, a gas supply, an aspirator to which the liquid can be delivered and by which the gas is drawn into and impelled forward and mingled with the liquid, said aspirator comprising a constrictive passage for the liquid, a chamber of relatively larger diameter than the stream of liquid and into which the liquid and gas are delivered, and an opening to admit the gas to the constricted stream of liquid, an absorption vessel, and means to maintain a predetermined difference between the pressures on the liquid and on the gas before mingling.

19. In an apparatus for charging liquids with gas, the combination of a liquid supply, a gas supply, a device to which both the liquid and the gas can be delivered and by means of which the gas is mingled with the liquid and impelled forward therewith and thereby, said device comprising a constrictive passage for the liquid, a chamber of relatively larger diameter than the stream of liquid and into which the liquid and gas are delivered, and an opening to admit the gas to the constricted stream of liquid, an absorption vessel, and means to maintain a predetermined difference between the pressures on the liquid before and after the mingling of the gas therewith.

20. In an apparatus for charging liquids with gas, the combination of a liquid supply, a gas supply, an aspirator to which the liquid can be delivered and by which the gas is drawn into and impelled forward and mingled with the liquid, said aspirator comprising a constrictive passage for the liquid, a chamber of relatively larger diameter than the stream of liquid and into which the liquid and gas are delivered, and an opening to admit the gas to the constricted stream of liquid, an absorption vessel, and means to maintain a predetermined difference between the pressures on the liquid before and after the mingling of the gas therewith.

21. In an apparatus for charging liquids with gas, the combination of a liquid supply, a gas supply, an aspirator to which the liquid can be delivered and by which the gas is drawn into and impelled forward and mingled with the liquid, said aspirator comprising a constrictive passage for the liquid, a chamber of relatively larger diameter than the stream of liquid and into which the liquid and gas are delivered, and an opening to admit the gas to the constricted stream of liquid, an absorption vessel, and means whereby predetermined relations are maintained between the pressure on the gas before mingling, the pressure on the liquid before mingling and the pressure on the charged liquid.

22. In an apparatus for charging liquids with gas, the combination of a liquid supply, a gas supply, a device whereby the liquid is caused to draw the gas, mingle it with itself and impel it forward, said device comprising a constrictive passage for the liquid, a chamber of relatively larger diameter than the stream of liquid and into which the liquid and gas are delivered, and an opening to admit the gas to the constricted stream of liquid, an absorption vessel, a valve controlled by the pressure on the discharged liquid to regulate the escape of the charged liquid from the absorption vessel and a valve controlled by the pressure on the liquid in advance of said device, to regulate the supply of liquid.

This specification signed and witnessed this 11th day of April, A. D. 1895.

JOSEPH SCHNEIBLE.

In presence of—
H. G. ROGERS,
E. A. GREELEY.